United States Patent [19]

Druyun et al.

[11] Patent Number: 5,312,579

[45] Date of Patent: May 17, 1994

[54] LOW PRESSURE PROCESS FOR CONTINUOUS FIBER REINFORCED POLYAMIC ACID RESIN MATRIX COMPOSITE LAMINATES

[75] Inventors: Darleen A. Druyun, Washington, D.C.; Tan-Hung Hou, Poquoson, Va.; Paul W. Kidder, East Falmouth, Mass.; Rakasi M. Reddy, Yorktown, Va.; Robert M. Baucom, Newport News, Va.

[73] Assignee: The United States of America as represented by the United States National eronautics and Space Administration, Washington, D.C.

[21] Appl. No.: 924,689

[22] Filed: Jul. 30, 1992

[51] Int. Cl.$^5$ .............................................. B29C 67/14
[52] U.S. Cl. ..................................... 264/258; 156/87; 156/228; 156/307.1; 156/312; 156/331.5; 264/331.12
[58] Field of Search ................... 264/257, 258, 331.12, 264/138; 156/87, 228, 245, 307.1, 312, 331.1, 331.5, 256, 263

[56] References Cited

U.S. PATENT DOCUMENTS

| | | | |
|---|---|---|---|
| 1,377,509 | 5/1921 | Novotny | 264/258 |
| 2,589,786 | 3/1952 | Engel et al. | 156/228 |
| 3,930,097 | 12/1975 | Alberino et al. | 428/260 |
| 4,664,936 | 5/1987 | Ueno et al. | 427/307 |
| 4,944,824 | 7/1990 | Gupta | 156/312 |
| 5,004,575 | 4/1991 | Johnston et al. | 264/331.12 |
| 5,104,474 | 4/1992 | Scola et al. | 156/307.1 |
| 5,124,199 | 6/1992 | O'Quinn et al. | 156/307.1 |
| 5,178,964 | 1/1993 | Scola et al. | 156/307.4 |

OTHER PUBLICATIONS

Masahira Ohta, Shoji Tami, T. W. Toweell, N. J. Johnston, and T. L. St. Clair, "Improved melt flow and physical properties of Mitsui Toatu's LARC-TPI #1500 series polymide", 35th International SAMPE Symposium, 1990, pp. 1030-1044.

Robert C. Harper, "Thermoforming of thermoplastic matrix composites, Part I", *SAMPE Journal*, vol. 28, No. 2, pp. 9-17, (Mar. 1992).

Robert C. Harper, "Thermoforming of thermoplastic matrix composites, Part II", *SAMPE Journal*, vol. 28, No. 3, pp.9-17, (May 1992).

*Primary Examiner*—Jay H. Woo
*Assistant Examiner*—Robert B. Davis
*Attorney, Agent, or Firm*—George F. Helfrich

[57] ABSTRACT

A low pressure process was developed for preparing a well-consolidated polyimide composite laminate. Prepreg plies were formed from unidirectional fibers and a polyamic acid resin solution. Molding stops were placed at the sides of a matched metal die mold. The prepreg plies were cut shorter than the length of the mold in the in-plane lateral direction and were stacked between the molding stops to a height which was higher than the molding stops. The plies were then compressed to the height of the stops and heated to allow the volatiles to escape and to start the imidization reaction. After removing the stops from the mold, the heat was increased and 0-500 p.s.i. pressure was applied to complete the imidization reaction. The heat and pressure were further increased to form a consolidated polyimide composite laminate.

7 Claims, 4 Drawing Sheets

LOW PRESSURE PROCESS FOR CONTINUOUS FIBER REINFORCED POLYAMIC ACID RESIN MATRIX COMPOSITE LAMINATES

ORIGIN OF THE INVENTION

The invention described herein was jointly made by a Government employee and during the performance of work under NASA contract NAS1-19000 and NASA grant NAG1-569 and is subject to the provisions of Section 305 of the National Aeronautics and Space Act of 1958, as amended, Public Law 85-568 (72 Stat. 435; 42 U.S.C. 2457) and 35 U.S.C. 202. In accordance with 35 U.S.C. 202, the contractor elected not to retain title.

BACKGROUND OF THE INVENTION

1. Field of the Invention

The present invention relates generally to composite materials. In particular, it relates to a low pressure process to prepare consolidated polyimide composite laminates.

2. Description of the Related Art

Compression molding of flat panels of fiber reinforced resin matrix composite laminates is the simplest form of a molding process which employs matched metal dies. In this process, individual prepreg plies are cut into the desired dimensions from a flat sheet of prepreg material. The number of prepreg plies used in this process is dependent on the desired final part thickness. The plies are stacked inside the cavity of the female mold and subjected to heat and compression forces to undergo consolidation. Ohta et al. ("Improved Melt Flow and Physical Properties of Mitsui Toatsu's LaRC-TPI #1500 Series Polyimide", 35th *International SAMPE Symposium and Exhibition*, Vol. 35, pp 1030-1044, Apr. 2-5, 1990.) reported using pressures of 2-7 MPa (284-994 p.s.i.) to form composites from LaRC-TPI.

Compression molding of a composite laminate is by no means a trivial process. Processing parameters such as heat transfer phenomena, resin flow behavior, fiber-resin interface wetting, adhesion and viscoelastic behavior, volatile escape mechanism, and bulk consolidation are just a few of the issues which need to be understood and controlled. For thermoplastic resins, resin flow behavior is one of the major issues involved in the compression molding process. The high viscosity of the resin creates problems in the wetting and penetration of reinforcing fibers, bonding of adjacent plies and removal of voids during lamination of plies, and resin flow during forming. Some forming processes are so rapid that there is insufficient time for all the entrapped air and/or volatile by-products in a prepreg stack to be expelled. Using conventional molding technology, void-free and well consolidated composite laminates are often difficult to achieve.

SUMMARY OF THE INVENTION

A low pressure process was developed to prepare well-consolidated polyimide composite laminates. This process involved changing the physical processing parameters without modifying the polymer resin. Prepreg plies were formed using unidirectional fibers which were impregnated with a polyamic acid resin solution. The polyamic acid solution used in the present invention had the following repeat unit:

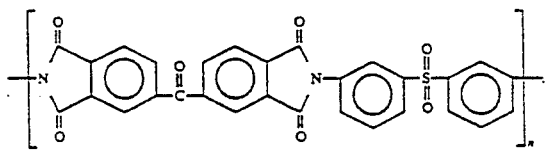

Techimer 2001

Molding stops were placed at the sides of a matched metal die mold at a height which was high enough to allow the volatile by-products to escape during the B-stage molding step and wide enough to allow the prepreg plies to spread in an in-plane lateral (perpendicular to the fiber) direction when consolidation pressure was applied. The prepreg plies were cut at least 1/16 inch shorter than the mold dimension in the in-plane lateral direction. Unidirectional and cross-ply laminates were formed from the plies. A cross-ply laminate was formed by stacking at least 2 consecutive plies at 0° and at least 2 consecutive plies at 90° alternating to a height which was higher than the molding stops giving the configuration of $(0)_2/(90)_2/(0)_2$.

The stacked prepreg plies were compressed to the height of the molding stops and were heated from 150°–250° C. for 0.25–1.50 hours to start the imidization reaction and to allow the volatiles to escape. It was found that heating at 200° C. for 0.5 hours gave the best results.

The molding stops were removed from the mold and the temperature was raised to 275°–370° C. A pressure of 0–500 p.s.i. was applied to the prepreg plies for 0.25–1.50 hours. Heating at 315° C. and 0 p.s.i. for 0.5 hours allowed the imidization reaction to go to completion and enhanced the resin flow throughout the matrix.

In order to form a well-consolidated polyimide composite, the fully imidized prepreg plies were further heated to 275°–370° C. while applying 100–600 p.s.i. pressure for 0.25–1.25 hours. A final cure cycle of heating at 350° C. and 500 p.s.i. for 0.5 hours yielded a well-consolidated polyimide composite as determined by C-scan. (In a C-scan, a material is ultrasonically scanned to determine its integrity.)

The object of the present invention is to prepare well-consolidated polyimide composite laminates from polyamic acid resin solutions using low pressure.

DESCRIPTION OF THE PREFERRED EMBODIMENTS

Figure 1:
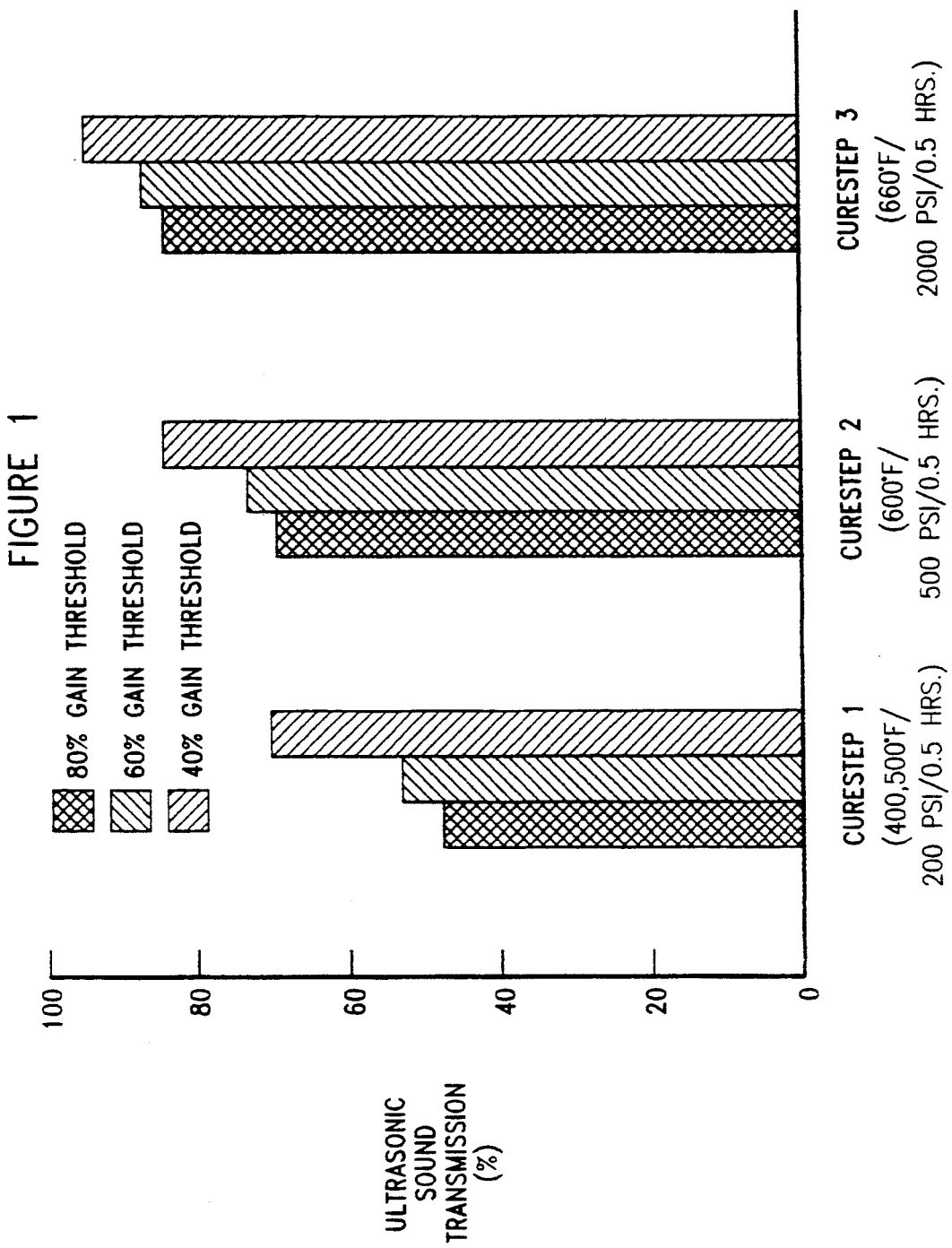
FIG. 1 is a C-scan of a unidirectional composite laminate consolidated using 2000 p.s.i. pressure.

In order to form void-free, fully consolidated polyimide composite laminates, various molding parameters must be controlled. The volatile by-product escape mechanism and the bulk consolidation behavior are the focus for the process of the present invention. During processing, these two parameters work against each other. Full consolidation of the composite part is achieved by applying pressure to remove the voids formed by the volatile by-products and to facilitate interply prepreg layer fusion of the resin matrix. If the pressure is applied too early in the molding cycle, the volatile escape paths will be blocked causing many voids to appear throughout the composite. Volatiles can also be trapped within the viscous resin matrix which results from an advanced degree of imidization. A delayed pressure application would be ineffective in eliminating these void spots. To overcome this problem, there must be a balance between the cure cycle (heating cycle) and the pressure cycle of the process. By the present invention, a molding process has been developed which allows for the escape of volatile by-products from the imidization reaction and achieves good consolidation using low pressure without resin modification.

Prepreg plies were formed using unidirectional AS-4 unsized carbon fibers with 12,000 filaments per tow which are commercially available from Hercules. These fibers were impregnated and drum wound with a resin solution having a solids content ranging from 27 to 45%. An example of this resin solution includes but is not limited to: Polyimidesulfone sold under the trademark Techimer 2001 available from High Technology Services, Incorporated. The drum wound prepreg was cut into sheets, sealed in plastic bags, and stored in the freezer at $-4°$ C. until required for molding.

Molding stops were placed at the sides of a matched metal die mold. The heights of these stops were high enough to allow the volatile by-products which are generated from the imidization reaction to escape from between the plies. The stops were also placed far enough apart to allow the prepreg plies to spread in an in-plane lateral (perpendicular to the fiber) direction.

The prepreg plies were cut at least 1/16 inch shorter than the mold dimension in the lateral direction to the fiber. It was found that cutting the plies ¼ inch shorter than the mold dimension gave optimal results. The plies were stacked in the following manner to form a cross-ply laminate: at least 2 plies were consecutively stacked at 0° and at least 2 additional plies were stacked consecutively at 90°, alternating to a height which is higher than the molding stops and giving the configuration of $(0)_2/(90)_2/(0)_2$. A minimum of 2 plies must be placed in the same direction in order to facilitate interply fiber-fiber nesting and in-plane spreading of the fiber-resin matrix in the lateral direction (to the fiber) when consolidation pressure was applied.

The stacked prepreg plies were B-staged by closing the male mold to the stops such that the stacked prepreg layers experienced practically zero pressure. This arrangement resulted in a loosely packed laminate structure which offered abundant volatile escape paths for the reaction by-products generated during curing. The prepreg plies were heated from 150°–250° C. for 0.25–1.25 hours to start the imidization reaction. Heating for 0.5 hours at 200° C. provided sufficient time for the volatile by-products to escape and resulted in a loosely packed laminate structure. If temperatures lower than 150° C. are employed during the B-stage, the degree of imidization is low and any consolidating pressure applied later will not only block the volatile escape paths within the fibers but will also squeeze out too much resin.

The molding stops were removed after completion of the B-stage. The removal of these stops created a desired excess volume within the cavity of the mold. The temperature was raised to 275°–370° C. for 0.25–1.50 hours while applying 0–500 p.s.i. pressure, completing the imidization reaction and allowing the resin to flow throughout the matrix. Heating at 315° C. and 0 p.s.i. pressure for 0.5 hours gave the best results.

A final consolidation step was performed by heating the fully imidized prepreg plies to 275°–370° C. under 100–600 p.s.i. pressure for 0.25–1.25 hours. It was found that heating at 350° C. and 500 p.s.i. for 0.5 hours allowed for possible lateral (side ways) movement of the fiber/resin matrix resulting in a rearrangement of the laminate structure. Better consolidation quality resulted because there was a lesser degree of applied pressure being absorbed by the fiber through the interply fiber-fiber nesting structure. In conventional molding, which uses a full cut pattern, such intimate interply fiber-fiber contact cannot be avoided resulting in poor consolidation quality.

The following examples are illustrative of but not limiting to the invention:

EXAMPLE 1

AS4/Techimer 2001 Control

Unidirectional AS4 unsized carbon fibers were impregnated with Techimer 2001 to form a prepreg which was 41% resin by weight. 10 ply unidirectional prepreg pieces 3.0″×3.0″ were cut and stacked in a female mold with a cavity measuring exactly 3.0″×3.0″. Without internal or external stops, the whole assembly with a male mold in place was placed in a vacuum press and cured according to the cycle in Table 1.

TABLE 1

| Step Number | 1 | 2 | 3 | 4 |
|---|---|---|---|---|
| Temperature (°C.) | 200 | 260 | 315 | 350 |
| Pressure (PSI) | 200 | 200 | 500 | 2000 |
| Time (hours) | 0.5 | 0.5 | 0.5 | 0.5 |

The C-scan (FIG. 1) revealed only about 80% overall void-free consolidation. The final panel thickness was 0.056±0.001 inches.

EXAMPLE 2

AS4/Techimer 2001 Low Pressure

Unidirectional AS4 unsized carbon fibers were impregnated with Techimer 2001 to form a prepreg ply with a resin content of 41% by weight. A 20 ply unidirectional 3.00″×3.00″ composite panel was molded. The prepreg was initially cut to a dimension measuring 3.00″ in the fiber direction and 2.75″ in the in-plane lateral direction. Two molding stops measuring 0.125″ each in width were added to each side of a 3.00″×3.00″ female mold. The prepreg plies were fitted exactly to the new 3.00″×2.75″ configuration. The cure cycle given in Table 2 was followed using a vacuum press.

TABLE 2

| Step Number | 1 | 2 | 3 | 4 |
|---|---|---|---|---|
| Temperature (°C.) | 200 | 260 | 315 | 350 |
| Pressure (PSI) | 0 | 0 | 0 | 500 |

TABLE 2-continued

| Step Number | 1 | 2 | 3 | 4 |
|---|---|---|---|---|
| Time (hours) | 0.5 | 0.5 | 0.5 | 0.5 |

Figure 2:
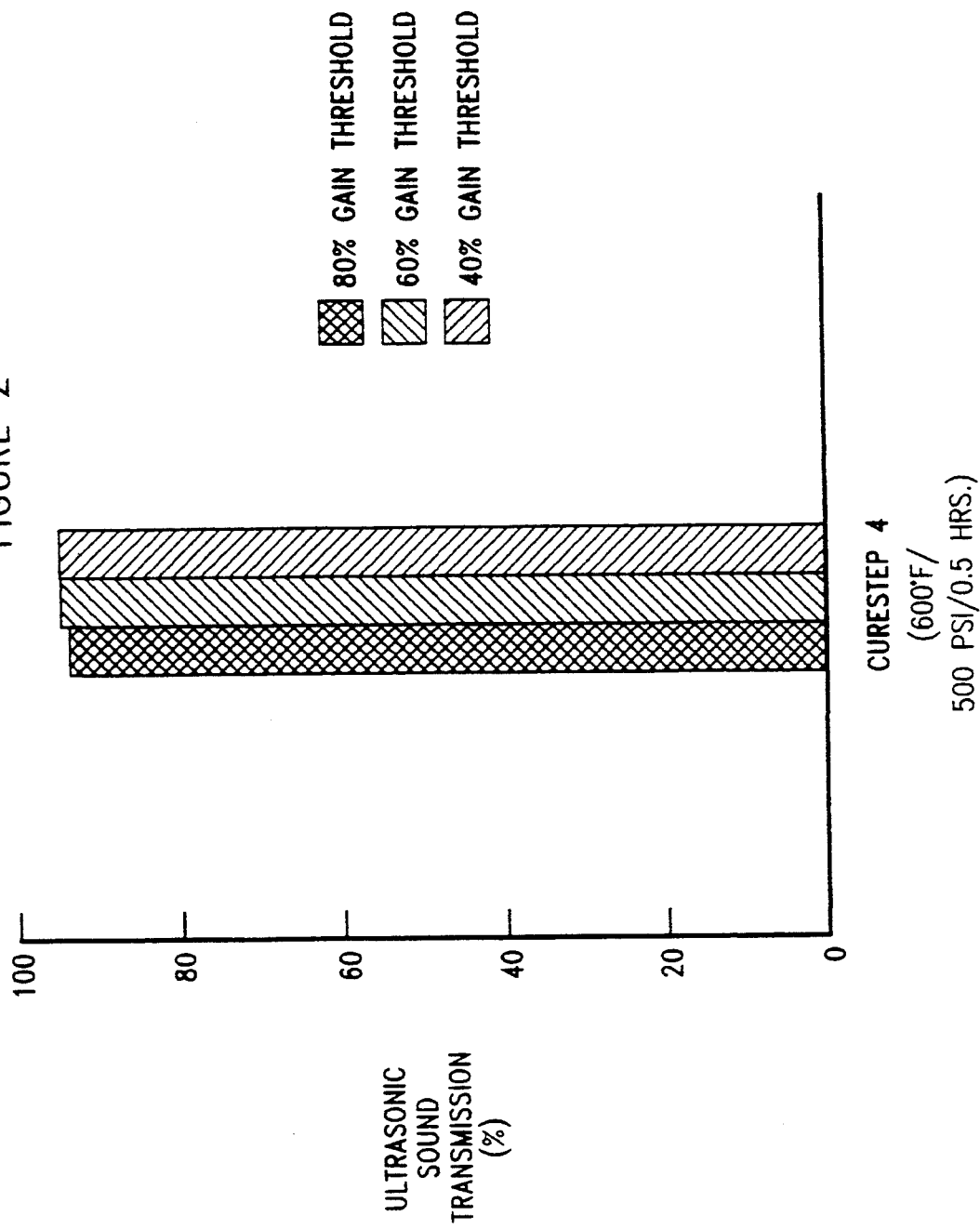
FIG. 2 is a C-scan of a unidirectional composite laminate consolidated using 500 p.s.i. pressure.

After the completion of step 2, the molding stops were removed and the cure cycle completed with steps 3 and 4. The resulting panel had a thickness of 0.123" and the C-scan (FIG. 2) showed outstanding consolidation.

EXAMPLE 3

AS4/Techimer 2001 Low Pressure Cross-Ply

Unidirectional AS4 unsized carbon fibers were impregnated with Techimer 2001 to form a prepreg ply with a resin content of 41% by weight. An 11 ply cross-ply laminate was laid up in the fashion of $(0)_3/(90)_5/(0)_3$. The prepreg was initially cut to a dimension measuring 3.00" in the fiber direction $\times$ 2.75" in the in-plane lateral direction. Two molding stops measuring 0.125" each in width were added to each side of a 3.00" $\times$ 3.00" female mold. The cure cycle given in Table 3 was followed using a vacuum press.

TABLE 3

| Step Number | 1 | 2 | 3 | 4 |
|---|---|---|---|---|
| Temperature (°C.) | 200 | 260 | 315 | 350 |
| Pressure (PSI) | 0 | 0 | 0 | 500 |
| Time (hours) | 0.5 | 0.5 | 0.5 | 0.5 |

Figure 3:
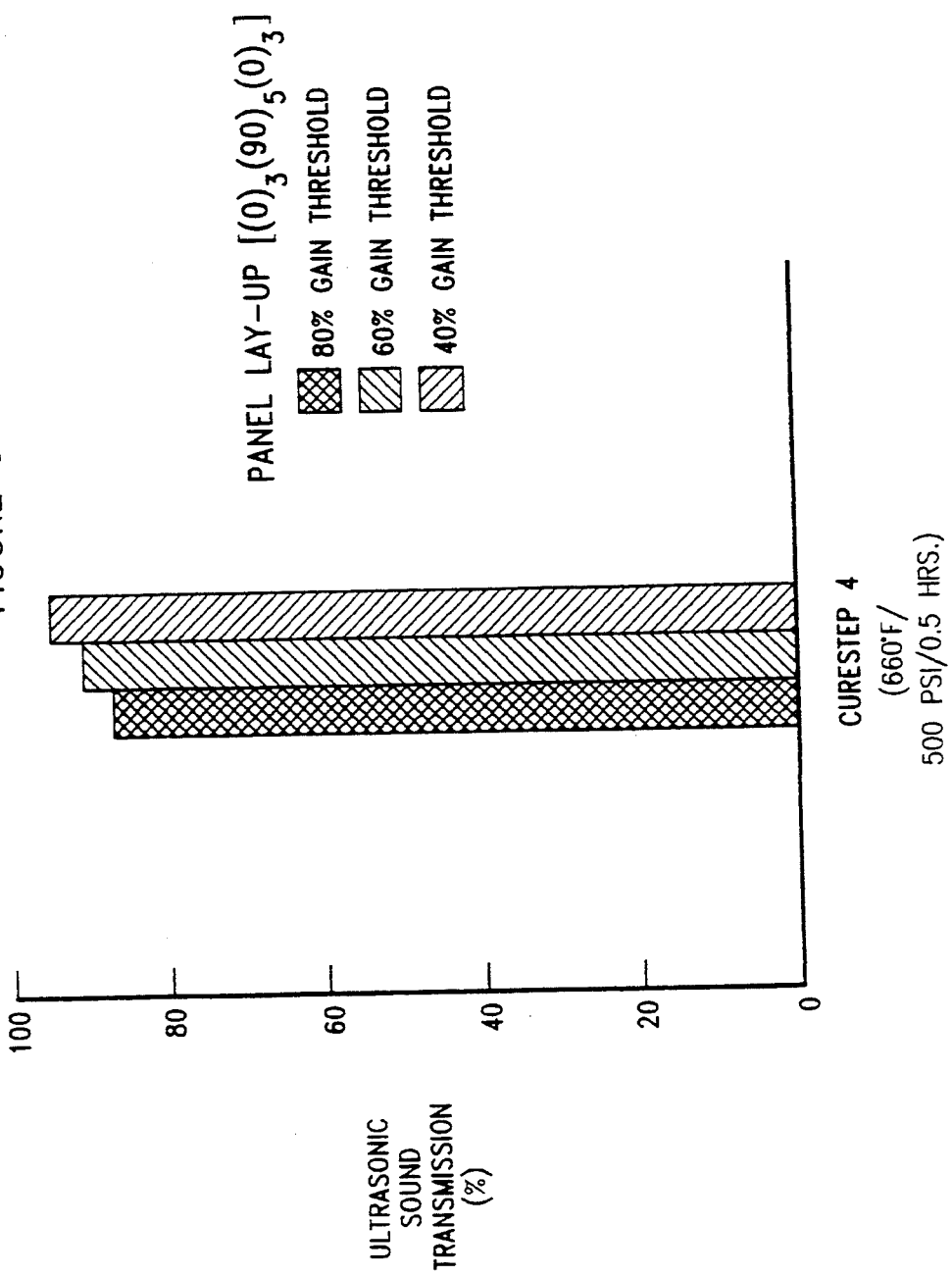
FIG. 3 is a C-scan of a cross-ply composite laminate consolidated using 500 p.s.i. pressure.

After completion of step 2, the molding stops were removed and the cure cycle was completed with steps 3 and 4. The panel had a final thickness of 0.080±0.002 inches and the C-scan (FIG. 3) showed a well-consolidated laminate.

EXAMPLE 4

AS4/Techimer 2001 Low Pressure Cross-Ply without Vacuum

Figure 4:
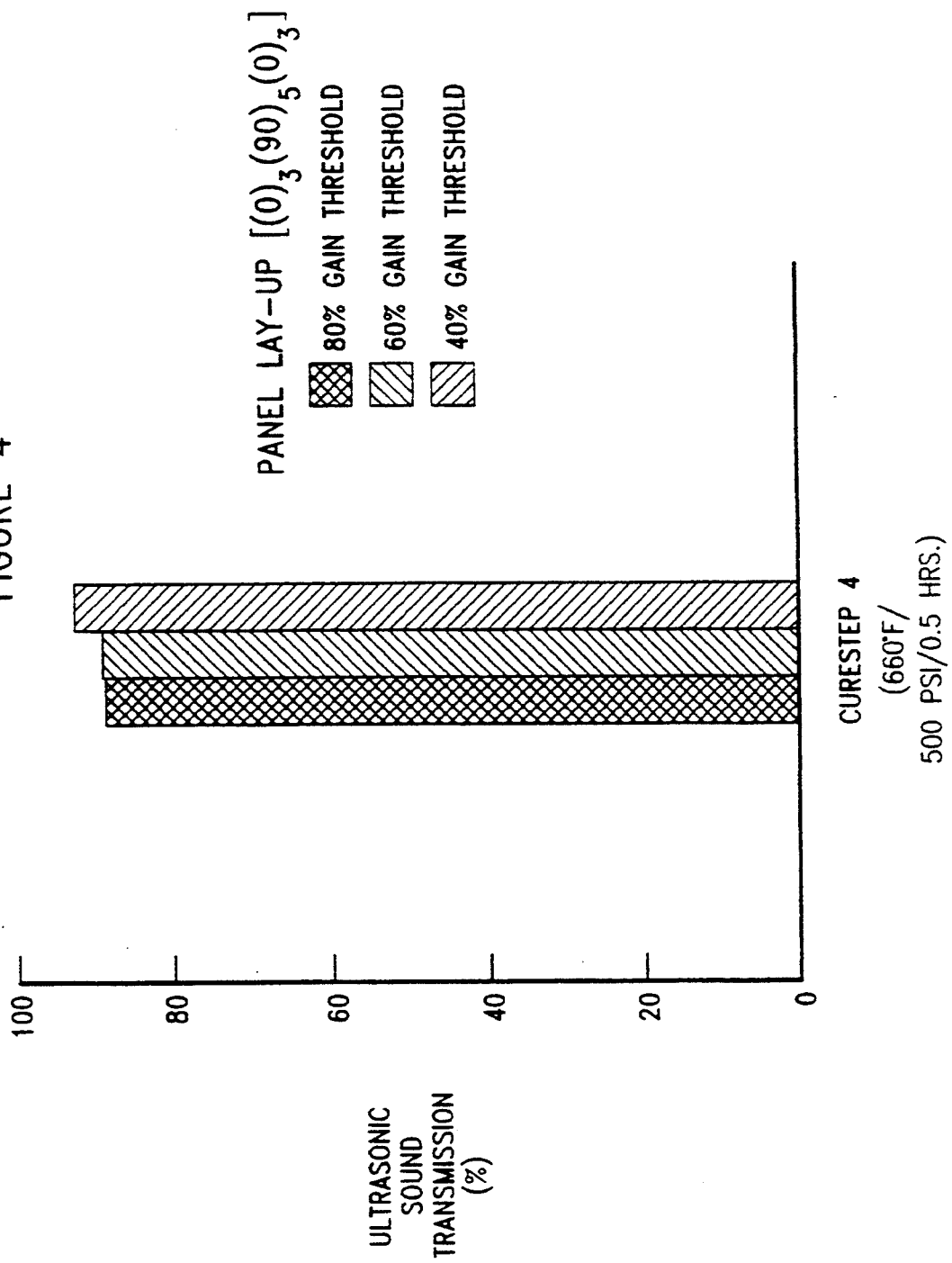
FIG. 4 is a C-scan of a cross-ply composite laminate formed using a conventional press.

A cross-ply laminate was compression molded following the procedure of Example 3 using a conventional press without vacuum. The resultant laminate had a final thickness of 0.073±0.002 inches and the C-scan (FIG. 4) showed a well-consolidated laminate.

What is claimed is:

1. A low pressure process for preparing a consolidated polyimide composite laminate comprising:
   a. forming prepreg plies from unidirectional fibers and a polyamic acid resin solution;
   b. placing molding stops at the sides of a matched metal mold set wherein one of the mold halves has a cavity therein;
   c. cutting the prepreg plies shorter than the length of the mold in an in-plane lateral direction;
   d. stacking the cut prepreg plies between the molding stops to a height which is higher than the molding stops wherein at least 2 prepreg plies are consecutively stacked in one direction in forming a cross-ply laminate;
   e. compressing the stacked prepreg plies to the height of the molding stops;
   f. heating the compressed prepreg plies to a temperature of about 150° C. to 250° C. for about 0.25 to 1.50 hours to start an imidization reaction and to allow volatiles to escape;
   g. removing the molding stops from the mold;
   h. increasing the temperature to a temperature of about 275° C. to 370° C. and applying a pressure to the prepreg plies of about 0 p.s.i. to 500 p.s.i. for about 0.25 to 1.50 hours to complete the imidization reaction and to enhance resin flow throughout the matrix; and
   i. further heating while applying a pressure of about 100 p.s.i. to 600 p.s.i. to the prepreg plies for about 0.25 to 1.50 hours to form a consolidated polyimide composite laminate.

2. The process according to claim 1, wherein said polyamic acid has the following structural repeat unit:

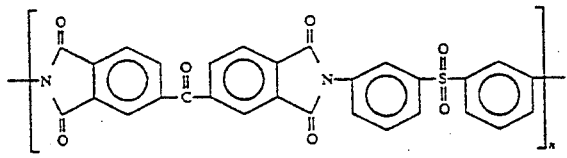

3. The process according to claim 1, wherein said molding stops are high enough to allow volatiles to escape and wide enough to allow the prepreg plies to spread in an in-plane lateral direction in response to application of consolidation pressure.

4. The process according to claim 1, wherein said prepreg plies are cut 1/16 inch less than the mold dimension.

5. The process according to claim 1, wherein said prepreg plies are heated to 200° C. for 0.5 hours to allow volatiles to escape.

6. The process according to claim 1, wherein said imidization reaction is completed and resin flow throughout the matrix occurs by heating at 315° C. and 0 p.s.i. for 0.5 hours.

7. The process according to claim 1, wherein said consolidated polyimide composite laminate is formed by heating at 350° C. and 500 p.s.i. for 0.5 hours.

* * * * *